V. JOHNSON.
VARIABLE SPEED MECHANISM.
APPLICATION FILED JAN. 7, 1908.

898,745.

Patented Sept. 15, 1908.

2 SHEETS—SHEET 1.

Attest:
E. M. Harrington.
M. P. Smith.

Inventor:
V. Johnson.
By Higdon & Longan
Attys.

V. JOHNSON.
VARIABLE SPEED MECHANISM.
APPLICATION FILED JAN. 7, 1908.

898,745.

Patented Sept. 15, 1908.
2 SHEETS—SHEET 2.

Attest.
E. M. Harrington.
M. P. Smith.

Inventor:
V. Johnson.
By Higdon Longan
Attys.

UNITED STATES PATENT OFFICE.

VICTOR JOHNSON, OF ST. LOUIS, MISSOURI.

VARIABLE-SPEED MECHANISM.

No. 898,745.  Specification of Letters Patent.  Patented Sept. 15, 1908.

Application filed January 7, 1908. Serial No. 409,733.

*To all whom it may concern:*

Be it known that I, VICTOR JOHNSON, a citizen of the United States, and resident of St. Louis, Missouri, have invented certain new and useful Improvements in Variable-Speed Mechanism, of which the following is a specification containing a full, clear, and exact description, reference being had to the accompanying drawings, forming a part hereof.

My invention relates to a variable speed mechanism, my object being to construct a simple, compact device whereby the power of the driving shaft is transmitted to a driven shaft at varying speeds, and which mechanism is particularly adapted for use on a lathe head, drill braces, and milling machines, or at any point where a variable speed is desired.

To the above purposes, my invention consists in certain novel features of construction and arrangement of parts, which will be hereinafter more fully set forth, pointed out in the claims, and illustrated in the accompanying drawings, in which:—

Figure 1:
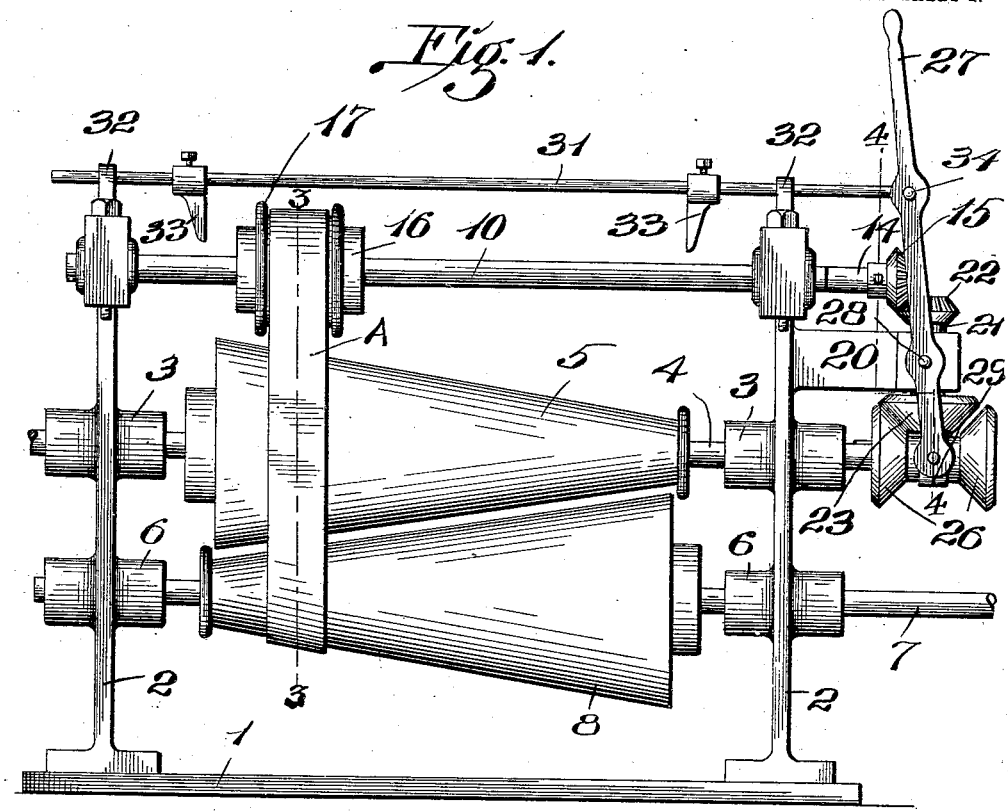
Figure 2:
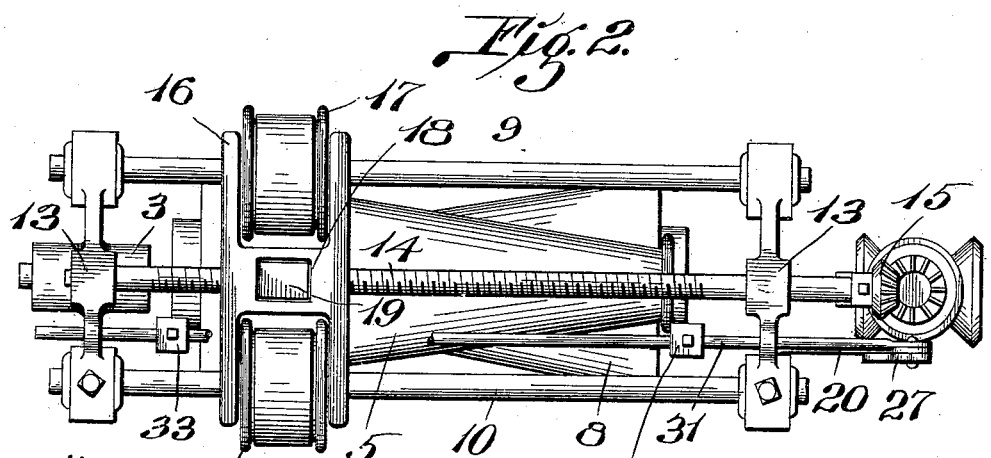
Figure 3:
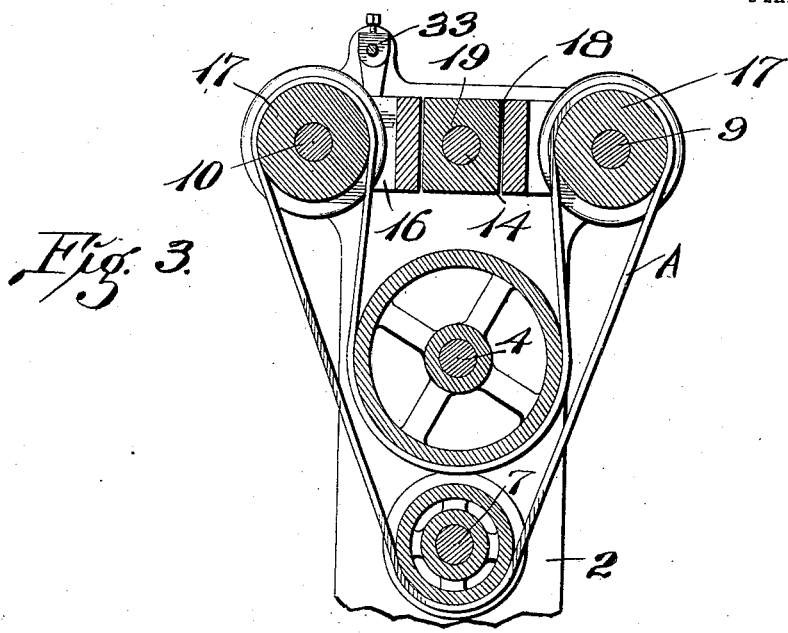
Figure 4:
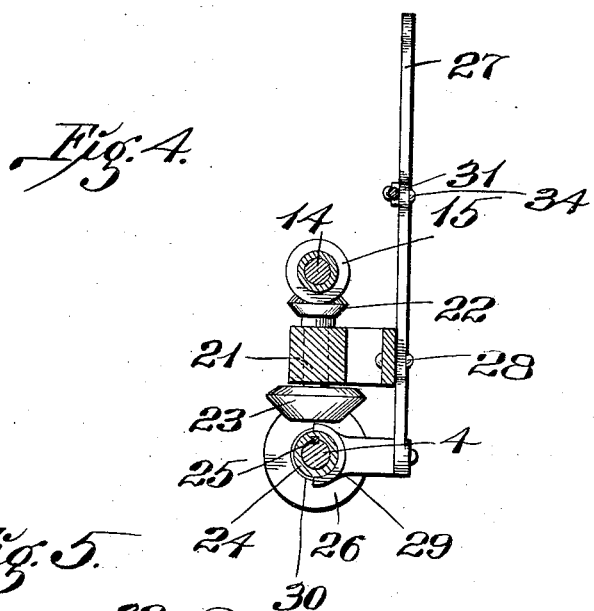
Figure 5:
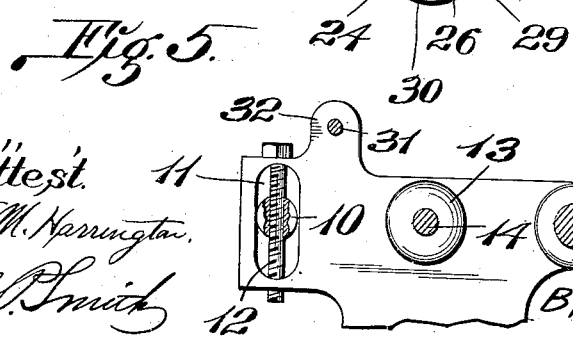

Figure 1 is a side elevation of a variable speed mechanism of my improved construction; Fig. 2 is a plan view of the mechanism; Fig. 3 is an enlarged vertical section taken on the line 3—3 of Fig. 1; Fig. 4 is a detail section taken on the line 4—4 of Fig. 1; Fig. 5 is a side elevation of the upper portion of the left hand end frame of the mechanism, with parts shown in section.

The frame of the device comprises a base 1, on which is fixed a pair of upright plates 2; and arranged for rotation in a pair of horizontally alined bearings on said plates is a driving shaft 4, on which is fixed an elongated cone pulley 5.

Arranged for rotation in bearings 6 formed in the lower portions of the plates 2 is a driven shaft 7, and fixed thereon, immediately below the pulley 5, is an elongated cone pulley 8, the same being oppositely disposed relative said pulley 5.

Fixed in the upper rear corners of the plates 2 is a longitudinally disposed rod 9; and positioned between the front upper corners of the plates 2 is a corresponding rod 10, the ends of which pass through vertically disposed slots 11 formed in said plates 2, and this rod 10 is made vertically adjustable by screws 12 passing through the ends of said rod and through portions of the plates 2 adjacent the slots 11.

Arranged for rotation in bearings 13, on the upper ends of the plates 2, between the rods 9 and 10, is a screw threaded shaft 14, on the right hand end of which is fixed a beveled pinion 15.

16 designates a carriage, the ends of which are bifurcated and receive pulleys 17, which latter rotate and slide upon the rods 9 and 10.

Formed in the center of the carriage 16 is an opening 18, in which is located a nut 19 mounted to travel on the screw shaft 14.

Formed integral with the right hand plate 2, between the screw shaft 14 and the shaft 4, is a bracket 20, in the outer end of which is journaled a short vertically disposed shaft 21, on the upper end of which is fixed a beveled pinion 22, meshing with the pinion 15; and fixed on the lower end of this shaft 21 is a beveled friction disk 23.

A sleeve 24 is arranged to slide on a feather 25 carried by the right hand end of the shaft 4; and formed integral with the ends of said sleeve is a pair of beveled friction disks 26, the surfaces of which are adapted to engage with the surface of the friction disk 23.

The sleeve and friction disks are shifted from one position to another by means of a hand-lever 27 fulcrumed on a pin 28 seated in a part of the bracket 20, and the lower end of said hand lever carrying a yoke 29 which engages in a groove 30 formed in the center of the sleeve 24.

A rod 31 is arranged to slide in bearings 32 formed integral with the upper end of the plates 2; and adjustably fixed on said rod are depending fingers 33, the lower ends of which lie in the path of travel of the upper portion of the carriage 16; and the right hand end of this rod 31 is pivotally connected at 34 to the upper portion of the hand lever 27.

When the device is set up and ready for use, a belt A is fitted to travel over the pulleys 17 beneath the cone pulley 5 and beneath the cone pulley 8.

When the driving shaft 4 is operated, the rotary motion thereof is transmitted by means of the belt A to the cone pulley 8, and consequently to the shaft 7; and the speed at which said last mentioned shaft is driven is dependent upon the position of the belt on the cone pulleys 5 and 8.

The belt is shifted to whatever position desired by actuating the hand lever 27 and shifting the sleeve 24 in either direction on the end of the shaft 4, which brings the face of one of the beveled friction disks 26 into engagement with the face of the friction disk 23; and, as a result of this friction engagement, the shaft 21 is rotated; and by means of the beveled pinions 22 and 15 the screw shaft 14 is rotated, and said shaft passing through the nut 19, which is held in the carriage 16, causes said nut and carriage to move longitudinally upon the rods 9 and 10, thus shifting the belt on the cone pulleys 5 and 8.

The shifting rod 31 and fingers 33 are provided in order that the belt shifting movement will automatically be reversed should the carriage 16 travel too far in either direction and there be danger of the belt traveling off the ends of the cone pulleys.

When the proper speed has been obtained for the shaft 7, the handle 27 is moved into a vertical position, which disengages both friction disks 26 from the disk 23, and this action necessarily results in non-rotation of the screw shaft 14; and the carriage 16 will consequently remain stationary.

The belt A is tightened by manipulating the screws 12 in such a manner as to elevate the rod 10, the ends of which rod pass through the slots 11.

A variable speed mechanism of my improved construction is very compact, comprises a minimum number of parts, is applicable for use wherever variable speed is desired, and is very efficient in the transmission of rotary motion from one shaft to another.

I claim:—

1. A variable speed mechanism, comprising a driving shaft, a driven shaft, oppositely disposed cone pulleys fixed on said shafts, a carriage arranged to travel longitudinally adjacent one of the cone pulleys, a pair of pulleys arranged for rotation in the carriage, a belt passing beneath the cone pulleys and over the pulleys on the carriage, and means thrown into operation by the carriage for automatically reversing the movement of said carriage.

2. A variable speed mechanism, comprising a driving shaft, a driven shaft, oppositely disposed cone pulleys fixed on said shafts, a carriage arranged to travel longitudinally adjacent one of the cone pulleys, a pair of pulleys arranged for rotation in the carriage, a belt passing beneath the cone pulleys and over the pulleys on the carriage, means actuated by the driving shaft for shifting the carriage longitudinally, and means whereby the shifting means is automatically reversed when the carriage reaches points in alinement with the ends of the cone pulleys.

3. A variable speed mechanism, comprising a driving shaft, a driven shaft, oppositely disposed cone pulleys fixed on said shafts, a pair of supports adjacent one of the cone pulleys, one of which supports is adjustable, a carriage adapted to travel on the supports, pulleys arranged in the carriage, and a belt passing beneath the cone pulleys and over the pulleys on the carriage.

In testimony whereof, I have signed my name to this specification, in presence of two subscribing witnesses.

VICTOR JOHNSON.

Witnesses:
M. P. SMITH,
E. L. WALLACE.